United States Patent Office 3,572,387
Patented Mar. 23, 1971

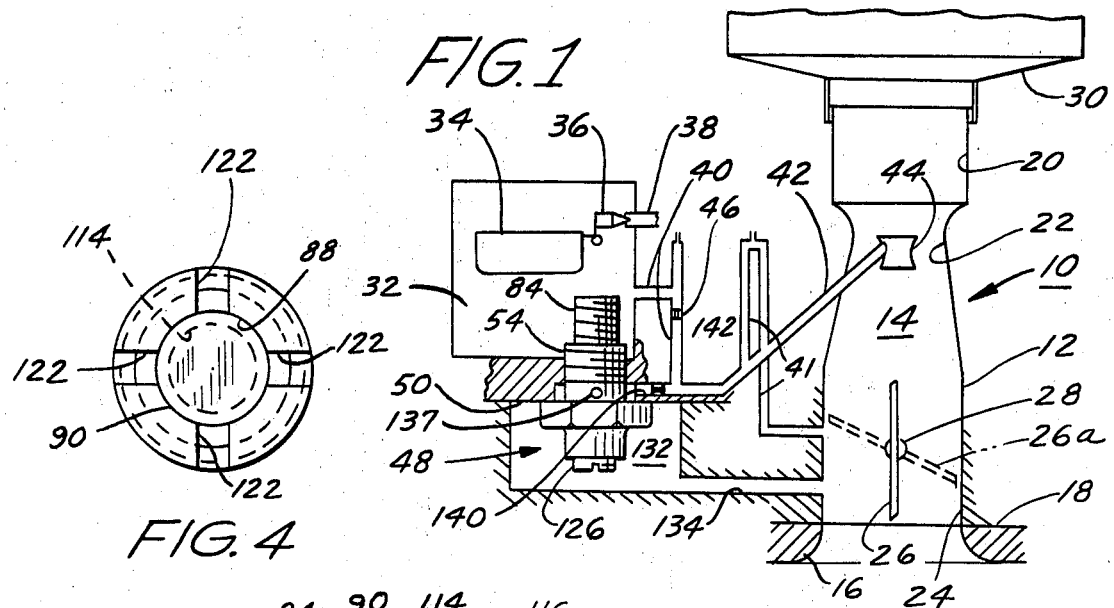
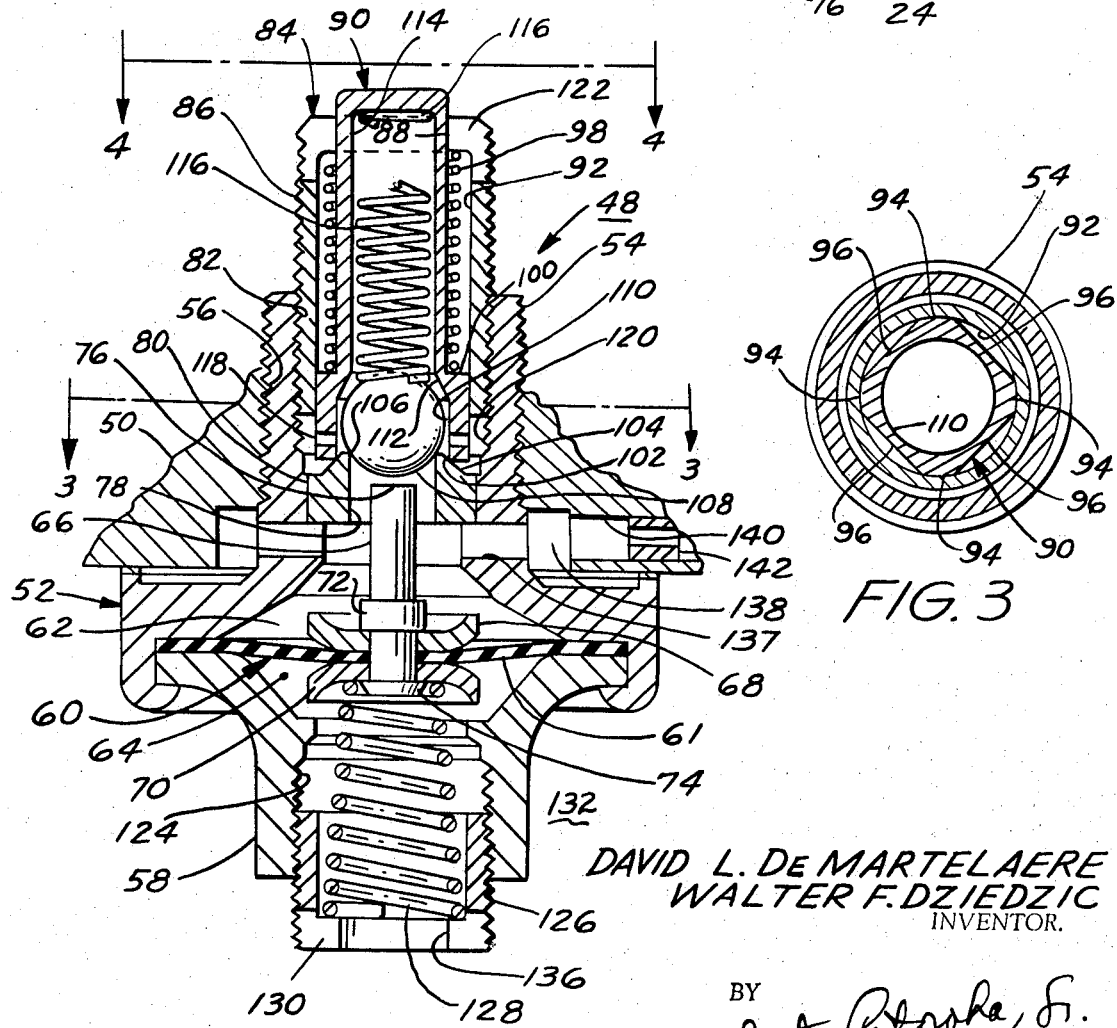

3,572,387
MULTISTAGE POWER VALVE ASSEMBLY
David L. De Martelaere, 20142 N. Larkmoor, Southfield, Mich. 48076, and Walter F. Dziedzic, 6368 Beechton, Detroit, Mich. 48210
Filed Dec. 16, 1968, Ser. No. 783,827
Int. Cl. F16k 11/14
U.S. Cl. 137—630.22      4 Claims

ABSTRACT OF THE DISCLOSURE

A power valve assembly has a housing with first and second concentrically formed valve seats therein and contains first and second generally telescoped valve members adapted to respectively cooperate with the first and second seats for controlling flow of fuel therethrough; a first spring tends to move the valves away from each other while a second spring functions to resiliently urge both valves against their respective seats.

BACKGROUND OF THE INVENTION

It has been accepted practice to provide, in carburetor structures, a power fuel enrichment system comprised of a power valve assembly carried by the carburetor in a manner so as to be affected by engine manifold vacuum. The manifold vacuum acting on a movable pressure responsive member, which is adapted for operative engagement with the valving means of the power valve assembly, at idle or normal load conditions, as well as during engine deceleration, is strong enough to overcome a spring resistance so as to maintain the valving means closed. When high power demands place a greater load on the engine and manifold vacuum drops below a predetermined value, the said spring overcomes the reduced vacuum thereby opening the valving means. Consequently, fuel flows through the open valve means and ultimately into the carburetor induction passage thereby enriching the otherwise normal fuel-air mixture. As engine demands are reduced manifold vacuum again increases. The increased vacuum acts on the pressure responsive member to finally overcome the resistance of the said spring thereby closing the valving means and shutting off the added supply of fuel which is no longer required.

The prior art has also suggested that such power valve assemblies be constructed so as to provide such additional fuel in stages instead of providing a single increased rate of fuel flow in order to thereby more closely tailor the increase in fuel flow to the requirements of the engine.

However, heretofore such multistage power valve assemblies have not been entirely successful because of certain undesirable characteristics. For example, the multistage power valve assemblies of the prior art have employed serially positioned valving members each of which coacted with serially situated valve seat. Usually such valve members were not positively guided during their movements toward and away from the valve seats thereby often creating a cocked position of the valve with respect to the seat.

Further, when such serially positioned valves were to be totally actuated, the opening force transmitted to the second valve would have to continually overcome a variable force of an intermediate spring situated between the first valve and a fixed spring seat. This increased the difficulty of attaining precise operating points with respect to which the second valve would open.

Accordingly, the invention herein disclosed and claimed directs itself to the solution of such problems as set out above including others which will become apparent.

SUMMARY OF THE INVENTION

According to the invention, a multistage power valve assembly comprises a housing containing two valve members therein which are in generally telescoped relationship so as to be capable of motion relative to each other as well as relative to said housing.

Accordingly, a general object of this invention is to provide a power valve assembly which is capable of providing staged incremental increases in fuel flow therethrough.

A further object of this invention is to provide a power valve assembly which will materially if not totally eliminate fuel leakage therethrough during such periods of operation as when the valve members are closed.

Another object of this invention is to provide a sequential valve opening arrangement which will not be adversely effected by multiple spring rates operating collectively during the opening movements of the secondary valving member.

Other objects and advantages of the invention will become apparent when reference is made to the following detailed description considered in conjunction with the accompanying drawings.

DESCRIPTION OF THE DRAWINGS

In the drawings:

FIG. 1 is a diagrammatic view of a carburetor and the fuel system thereof showing, on an enlarged scale, the power valve assembly of the present invention incorporated therein;

FIG. 2 is an enlarged longitudinal cross-sectional view of the power valve assembly, of FIG. 1, constructed in accordance with the teachings of this invention;

FIG. 3 is a cross-sectional view taken generally on the plane of line 3—3 of FIG. 2 and looking in the direction of the arrows; and FIG. 4 is a top plan view taken generally on the plane of line 4—4 of FIG. 2 and looking in the direction of the arrows.

DESCRIPTION OF PREFERRED EMBODIMENT

Referring now in greater detail to the drawings, FIG. 1 diagrammatically illustrates a carburetor 10 having a body 12 with an induction passage 14 formed therethrough communicating with the passageway 16 of the intake manifold 18, of an associated internal combustion engine, upon which the carburetor 10 is mounted. The induction passage 14 may be comprised of an air inlet 20, a main venturi 22 and a mixture outlet 24 in communication with manifold passageway 16. The flow through the induction passage 14 may be controlled by a throttle valve 26 mounted on a throttle shaft 28 for pivotal rotation therewith so as to be variably positioned as by manual operation thereof. Usually an air cleaner, such as is indicated fragmentarily at 30, is connected to the air inlet.

Fuel is supplied to the induction passage 14 from a reservoir 32, which in the example shown is a float chamber of a fuel bowl having a float 34 therein which actuates a fuel valve 36 controlling a fuel inlet 38 leading from any suitable source of supply.

The fuel flows from reservoir or fuel bowl 32 through a conduit 40 to the main fuel nozzle conduit 42 which discharges at the throat of the main venturi 22. A second venturi 44 may be provided to form a discharge member for the main nozzle. A metering restriction 46 is provided in conduit means 40, as is the usual practice, and an idling fuel passage 47 may lead as from conduit means 40 or 42 to discharge adjacent the edge of the throttle valve 26 when in its closed position as shown in phantom lines at 26a. Suitable acceleration pump mechanism, as well as check valves, vents and metering orifices may be provided, as is well known in the art.

As shown in both FIGS. 1 and 2, a multistage power valve or economizer assembly 48 is situated within a casing or housing portion 50 of the structure generally defining the reservoir 32. The power valve assembly 48 is illustrated as being comprised of generally tubular housing 52 having formed thereon an externally threaded portion 54 for threadably engaging an internally threaded portion 56 of the casing structure 50.

One end of housing 52 cooperates with a cover-like end member 58 to peripherally secure a pressure responsive diaphragm 60 therebetween thereby defining two variable and distinct chambers 62 and 64 on opposite sides of the diaphragm. A valve actuating rod or stem 66 suitably secured at one end, as by opposed diaphragm plates 68, 70 and cooperating shoulder retaining portions 72, 74 to diaphragm 60, has its other end 76 freely disposed within a conduit portion 78 of a valve seat member 80 carried within housing or body 52. The upper tubular portion of body or housing 52 has an internally threaded portion 82 which threadably receives a cup-like member 84 having an externally threaded portion 86. As seen in both FIGS. 2 and 4, the upper end of cup member 84 has an aperture 88 formed therethrough for the close slidable reception therein of a generally tubular or sleeve-like valve member 90. A bore 92 formed in cup-like member 84 serves to guide the other or lower end of sleeve valve 90 which, as is shown in FIG. 3, is generally of a square cross-section having the corners thereof arcuately shaped, as at 94, to closely conform to the surface of bore 92. As will also be seen, the clearance between sides 96 of valve member 90 and bore 92 provides space for the flow of fuel therebetween.

A coiled compression spring 98, situated within bore 92 and generally about valve member 90, engages at its respective ends the end portion of member 84 and shoulder or flange like portions formed on sleeve valve 90 as at 100 thereby resiliently urging the sleeve valve 90 downwardly. An annular valving surface or portion 102, formed at the lower end of valve member 90 is thereby resiliently urged into seating engagement with a generally frustoconical seat or seating surface 104. A second annular seat 106, formed on member 80 generally about conduit 78 and substantially concentric with annular seat 106, is adapted to be at times engaged by a ball type valve member 108 which is closely received within a bore 110 formed within valve member 90. As can best be seen in FIG. 2, the upper end of bore 110 in valve member 90 is provided with an annular, generally conical, abutment surface 112 which, as will become evident, is adapted to be at times engaged by the ball valve 108. A second bore 114 in valve member 90, of reduced diameter, accommodates the placement therein of a coiled compression spring 116 which is seated at its upper end against the closed end portion of valve 90 and at its lower end against ball valve 108. It should be pointed out that the pre-load of spring 98 is substantially greater than that of spring 116 thereby not permitting spring 116 to actually separate valve members 90 and 108. One or more restrictive flow means such as calibrated passage means 118 are formed through a wall of the sleeve valve member 90 so as to communicate generally between the bore 110 and chamber 120 formed generally about the lower end of valve member 90 when in the position illustrated so as to communicate the fuel in chamber 120 to the bore 110 and, when ball valve 108 is raised off seat 106, to conduit 78. Fuel, of course, reaches chamber 120 by means of the upper end of spring seat 84, which is provided with a plurality of open slots 122 formed through the wall thereof, which as shown in FIG. 1 is in communication with the reservoir 32. The fuel then flows between the bore 92 of spring seat 84 and valve member 90 passing through the space between sides 96 of valve member 90 and bore of spring seat or valve guide 84 thereby reaching chamber 120.

End member 58 is provided with a internally threaded portion 124 for threadably engaging a second adjustable spring seat 126 which serves to contain a compression spring 128 having one end seated thereagainst and an other end seated in operative engagement with diaphragm 60. Seat 126 may be provided with slots 130, similar to slots 122, which are adapted to be engaged as by some bladed tool for rotational adjustment thereof.

As can be seen in FIGS. 1 and 2, a general chamber 132 may be formed about the lower end of power valve assembly 48 as by any suitable structure as is well known in the art.

Chamber 132, in communication with the induction passage 14, by means of a conduit portion 134, at a point downstream of the throttle valve when the throttle valve is closed as at 26a, serves to complete communication of manifold vacuum to chamber 64 of power valve assembly 48 by means of orifice 136 in spring seat 126. Further, a plurality of radially directed discharge orifices or passages 137 are formed through body 52 so as to communicate fluid flow from conduit 78 to an annulus 138 and conduit 140 formed as in the structure 50. A metering restriction 142 is preferably situated within conduit 140 so as to at times control the flow of fuel through conduit 140 to the main well or nozzle conduit 42 at a point downstream of main restriction 46 in conduit 40.

OPERATION

Generally, it is well known in the art that the value of manifold vacuum generated by the engine will vary depending on such factors as engine speed, road load and throttle valve position. For example, with the engine operating at idle, a relatively high value of manifold vacuum will be generated because, at such time, the throttle valve 26 is in its nominally closed position illustrated in phantom line at 26a During such time, as is well known in the art, the principal means for supplying fuel to the induction passage 14 and intake manifold 16 is by suitable conduitry, such as at 47, and metering means collectively referred to as the idle fuel system. Such idle fuel systems are well known in the art and, for purposes of clarity, are only diagrammatically illustrated herein since the practice of the invention is not in any way limited to or by an associated idle fuel system. During such idle engine operation the manifold vacuum may be of a value in the order of 16.0 to 19.0 inches of mercury (Hg).

As the vehicle is started into motion by the movement of the throttle valve 26 (in the clockwise direction in FIG. 1) in the opening direction, the load placed on the engine increases and because of the throttle valve 26 being moved toward a more fully opened position the value of the manifold vacuum decreases. The amount of decrease will depend on the load placed on the engine as well as the rapidity with which the throttle valve 26 is rotated from its nominally closed position toward a more fully opened position. If the engine load is sufficiently great and the opening movement of the throttle is sufficiently rapid, the manifold vacuum may, during this time, decrease to a value in the order of 1.0 to 4.0" Hg.

Further, when the vehicle is decelerating with the throttle valve nominally closed and the vehicle driving the engine, the value of the generated manifold vacuum may well substantially exceed that established at idle engine operation and be in the order of 21.0 to 22.0" Hg.

Accordingly, it can be seen that manifold or engine-generated vacuum is related to engine operation and as such may be employed as not only an actuating force but also as a control parameter for related devices. Further, it can be seen that enveloping chamber 132 (FIG. 1), chamber 64 and one side 61 of diaphragm 60 will be exposed to manifold vacuum of a varying value, depending upon throttle position and engine load by virtue of the communication established by conduit 134.

The main fuel system, for example comprising restriction 46, conduit 40 and main nozzle conduit 42, serves to supply fuel to the induction passage 14 generally during normal off-idle engine operation, as is well known in the art. Further, the manifold vacuum acting on diaphragm 60 at conditions of idle, normal load conditions or deceleration is sufficient to overcome the force of spring 128 thereby holding valve actuating stem 66 in the position generally illustrated, and permitting valves 108 and 90 to be held shut against their respective valve seats 106 and 104. However, when demands for higher power place a greater load on the engine and manifold vacuum decreases below a predetermined value, spring 128 overcomes the pressure differential across diaphragm 60 and moves stem 66 upwardly sufficiently to unseat valve member 108 and sleeve valve member 72 thereby enabling fuel to flow out of reservoir 32 through the inlet slots or openings 122, through bore 92 and the spaces between sides 96 of valve 90 and bore 92 to the chamber 120 from where the fuel flows through conduit 78 and out of the discharge passages 137 and into conduit 140 from where it flows into the main nozzle conduit means 42. The rate of fuel flow from the fuel bowl chamber or reservoir 32 to main well or conduit 42 being thusly increased by the opening of the power valve assembly 48 causes an enrichment of the flow through the main fuel discharge nozzle 42 resulting in, of course, the ultimate enrichment of the fuel-air mixture being supplied to the induction passage 14 intake manifold passageway 16. As engine power demands are reduced, manifold vacuum increases; when the vacuum has sufficiently increased, the pressure differential created across diaphragm 60 overcomes the force of spring 128 and again closing valves 108 and 90 against their respective seats 106 and 104 terminating the flow of fuel therethrough. This results in the rate of fuel flow being again conrolled primarily by the effects of main restriction 46.

The preceding is, of course, a general statement of the overall operation of the main fuel metering system and the correlated operation of the power valve assembly 48 in the fuel enrichment system. However, the following is a more detailed description of the fuel enrichment system, especially the power valve assembly 48 of the invention.

In view of the preceding it is of course apparent that diaphragm 60 and stem 66 will not always move upwardly to their maximum stroke position. That is, the distance of upward movement of diaphragm 60 and stem 66 will depend on the value of manifold vacuum, the pre-load as well as the spring rate of compression spring 128 and the pre-loads and spring rates of both springs 98 and 116 of power valve assembly 48.

Accordingly, the action of power valve assembly 48 can best be appreciated if its operation is considered relative to incremental changes in the value of manifold vacuum. For example, when a predetermined value of manifold vacuum is experienced by diaphragm 60, valve actuating stem 66 will have moved, because of spring 128, to a position of abutting engagement with the lower end of ball valve 108. A further reduction in the value of manifold vacuum causes a progressive further upward movement of diaphragm 60 and stem 66 inner or first stage valve member 108. Such upward movement of valve member 108 is not initially accompanied by a corresponding movement of the sleeve or second stage valve 90 because the relative preloads as well as the spring rates of springs 116 and 98 are such as to keep valve surface 102 seated against valve seat 104 while permitting upward movement of first stage valve 108.

As inner valve 108 is thusly opened, fuel from reservoir 32 flows through bore 92, in communication therewith to chamber 120. At this time secondary valve 90 is still maintained closed against cooperating valve seat 104 by the preload force of spring 98. Consequently, the fuel which flows into chamber 120, being unable to flow between valving surface 102 and seat 104, flows through the calibrated orifices 118 into bore 110 generally beneath ball valve 108. From there the fuel flows through conduit 78 and out of the discharge orifices or passages 137 into, for example, an annulus 138 formed in casing 50 from where the fuel flows through conduit means 140 into the main nozzle conduit 42.

It should be mentioned that during this time, orifices 118 collectively function as a metering restriction. That is, the total flow through primary orifices 118 is such as to be less than that rate of flow at which restriction 142 will exhibit any substantial metering function.

The upward movement of only primary valve 108 will continue, with accompanying decreasing values of manifold vacuum, until such time as the upper portion of primary valve 108 abuts against the conical abutment surface 112 formed within secondary valve member 90.

After axial abutting engagement between valves 108 and 90 is thusly achieved, further reductions in the value of manifold vacuum is accompanied by diaphragm 60, stem 66 and spring 128 urging both inner and outer valves 108 and 90 upwardly against compression spring 98. As outer or secondary valve 90 is thereby moved upwardly, the valving surface 102 thereof moves away from coacting seat 104 thereby permitting the fuel flowing into chamber portion 120 to have a second flow path between valve surface 102 and seat 104. Such fuel then flows through conduit 78 and discharge orifices or ports 137 into the annulus 138 and through conduit 140 and the main nozzle conduit 42. During this period of operation fuel is flowing through both paths within the multistage power valve assembly 48 described generally by orifices 118 and valve surface 102. As has been previously stated, a restriction 142 is preferably provided within the conduit means 140 so as to thereby provide a metering function to the fuel flowing therethrough when both primary and secondary valves 108 and 90 respectively, are opened. This restriction 142 of course then tailors the rate of additional fuel flow to the requirements of the particular engine with which the carburetor and power valve are associated.

In view of the preceding it should be apparent that the power valve assembly of the invention provides a structure whereby the rate of additional fuel flow to the engine, in order to enrich the fuel-air mixture in the induction passage 14, is applied in stages so that the rate of such additional fuel flow is more nearly the exact quantity of additional fuel which is required for that particular condition of engine operation.

The preferred embodiment of the invention herein described also discloses major advantages which further enhance the operation of the power valve assembly as well as significantly contribute to the ease of fabrication and therefore a reduction in the cost thereof.

One of the major advantages of the invention is that, contrary to prior art structures, both primary valve 108 and secondary valve 90 are completely guided throughout their respective full strokes of movement. This, of course, prevents cocking of the respective valves especially at such critical times as when complete seating of the valves is required. Such guiding is accomplished by having the primary valve slidably guided within the bore 110 of the secondary valve 90 and, in turn, having the secondary valve guided within the bore 92 of housing portion 84.

Another advantage of the invention is the ability, because of the relationship of valves 90 and 108, to have a multistage power valve assembly of an overall length substantially shorter than that of the prior art where two separate valves are arranged in general series relationship with each other. This again is the result of situating one valve physically within the other valve. The overall length of such multistage power valves is becoming a factor because the packaging of various engine accessories within the engine compartment is more critical with the continuing limitations placed on the space thereof due to styling requirements.

Further, contrary to the prior art, the construction of the invention enables the formation of concentric valve seats 104 and 106 within seat member or portion 80 because during fabrication thereof, a single tool with dual cutter surfaces may be employed for the simultaneous machining of both seats 104 and 106. In the prior art, where serially situated valves are employed, it becomes necessary to machine each seat separately thereby introducing some degree of eccentricity between such seats. Such eccentricity when coupled especially with unguided valve members usually results in a high degree of fuel leakage during periods when such valves are supposed to be closed.

Still another important advantage of the invention is the fact that it makes it easier to determine and attain the precisely chosen point of opening of the secondary valve 90. This is achieved by having the spring rate of spring 116 taken out of the system before opening of the secondary valve 90 is initiated. This, of course, results because of the relative pre-loads and spring rates of springs 116 and 98. Accordingly, once inner valve 108 abuts against surface 112 of valve 90, spring 116 is no longer a factor in determining the point at which secondary valve 90 will open since the opening thereof will be controlled solely by the existing pre-load and spring rate of spring 98.

Although only one preferred embodiment of the invention has been disclosed and described, it is apparent that other embodiments and modifications of the invention are possible within the scope of the appended claims.

We claim:

1. A multistage power valve assembly, comprising housing means, an axially extending bore formed in said housing means, an inlet formed in said housing means communicating with said bore, an outlet formed through a wall of said housing means, conduit means situated generally between said inlet and said outlet for at times completing communication therebetween, a first relatively small annular valve seat formed generally about said conduit means at one end thereof, a second relatively large annular valve seat formed generally about said conduit means at said one end thereof, first and second valve members telescopingly arranged with respect to each other and slidably received within said bore, spring means carried within said housing means continually biasing said valve members in opposite directions and at the same time continually resiliently urging said first and second valve members into respective seating engagement with said first and second valve seats in order to preclude fluid flow from said bore and into and through said conduit means, said spring means comprising a first spring member situated within said bore and operatively engaging at its respective opposite ends said housing means and said second valve member, and a second spring member situated within said second valve member and operatively engaging at its respective opposite ends said second valve member and said first valve member, said second valve member comprising a sleeve-like configuration having one open end, and wherein a ball-type valve comprises said first valve member, said ball-type valve being received within said one open end.

2. A multistage power valve assembly comprising housing means, an axially extending bore formed in said housing means, an inlet formed in said housing means communicating with said bore, an outlet formed through a wall of said housing means, conduit means situated generally between said inlet and said outlet for at times completing communication therebetween, a first relatively small annular valve seat formed generally about said conduit means a tone end thereof, a second relatively large annular valve seat formed generally about said conduit means at said one end thereof, first and second valve members telescopingly arranged with respect to each other and slidably received within said bore, spring means carried within said housing means continually biasing said valve members in opposite directions and at the same time continually resiliently urging said first and second valve members into respective seating engagement with said first and second valve seats in order to preclude fluid flow from said bore and into and through said conduit means, said housing means comprising a generally tubular housing portion receiving therein a threadably telescoping valve guide member, said bore being formed internally of said valve guide member, one end of said second valve member being guided within said bore and the other end of said second valve member being guided within an aperture formed in said valve guide member concentrically with said bore, abutment means carried by said second valve member, said abutment means comprising a shoulder-like surface adapted to abuttably engage said first valve member after said first valve member has been moved a predetermined distance away from said first valve seat, said spring means comprising a first spring member situated within said bore and operatively engaging at its respective opposite ends said housing and said second valve member, and a second spring member situated within said second valve member and operatively engaging at its respective opposite ends said second valve member and said first valve member, said second spring member having a pre-load force significantly less than the pre-load force of said first spring member.

3. A multistage power valve assembly comprising housing means, an axially extending bore formed in said housing means, an inlet formed in said housing means communicating with said bore, an outlet formed through a wall of said housing means, conduit means situated generally between said inlet and said outlet for at times completing communication therebetween, a first relatively small annular valve seat formed generally about said conduit means at one end thereof, a second relatively large annular valve seat formed generally about said conduit means at said one end thereof, first and second valve members telescopingly arranged with respect to each other and slidably received within said bore, spring means carried within said housing means continually biasing said valve members in opposite directions and at the same time continually resiliently urging said first and second valve members into respective seating engagement with said first and second valve seats in order to preclude fluid flow from said bore and into and through said conduit means, passage means formed between said bore and said second valve member to permit fluid flow therebetween whenever said first valve member is caused to be moved away from said first valve seat, restrictive orifice means formed through said second valve member so as to permit a metered rate of flow therethrough and through said conduit means of said fluid flowing through said passage means, abutment means carried by said second valve member, said abutment comprising an annular abutment surface formed within said second valve member and adapted to abuttably engage said first valve member when said first valve member has been moved a predetermined distance away from said first valve seat, said spring means comprising a first coiled compression spring situated within said bore and operatively engaging at its respective opposite ends said housing means and said second valve member, a second coiled compression spring member situated within said second valve member and operatively engaging at its respective opposite ends said second valve member and said first valve member, said second spring member passing generally through said annular abutment surface and having a pre-load force significantly less than the pre-load force of said first spring member, and including a valve actuating member, said actuating member being effective to at times freely pass through said conduit means so as to engage said first valve member and move said first valve member away from said first seat and toward said annular abutment surface, said actuating member also being effective to at times cause said second valve member to move away from said second valve seat by first moving said first valve member into engagement with said annular abutment surface and then continuing to move said first valve member in a direction away from said first valve seat.

4. A multistage power valve assembly according to claim 3 wherein said second valve member comprises a sleeve-like-configuration having one open end with an annular valving surface formed thereabout, and wherein a ball-type valve comprises said first valve member, said ball-type valve being closely received within said one open end and adapted for a limited degree of movement relative thereto.

References Cited
UNITED STATES PATENTS

| | | | |
|---|---|---|---|
| 826,276 | 7/1906 | Robinson | 137—630.22 |
| 1,072,796 | 9/1913 | Vance | 137—630.22 |
| 1,331,720 | 2/1920 | Paterson | 137—630.22 |
| 1,580,618 | 4/1926 | Lovequist | 137—630.22 |
| 2,067,445 | 1/1937 | Ginter | 137—630.22 |
| 2,693,201 | 11/1954 | Page | 137—628X |
| 2,694,405 | 11/1954 | Field | 137—630.14X |
| 2,936,784 | 5/1960 | Putz | 137—630.22 |
| 2,949,128 | 8/1960 | Carter | 137—630.14X |
| 2,993,507 | 7/1961 | Daly | 137—630.14X |
| 3,114,391 | 12/1963 | Kurtz. | |
| 3,213,887 | 10/1965 | Angelery | 137—630.15 |
| 3,236,261 | 2/1966 | Morgan | 137—630.22 |

CLARENCE R. GORDON, Primary Examiner

U.S. Cl. X.R.

123—103, 198; 137—630.14